Figure 1:
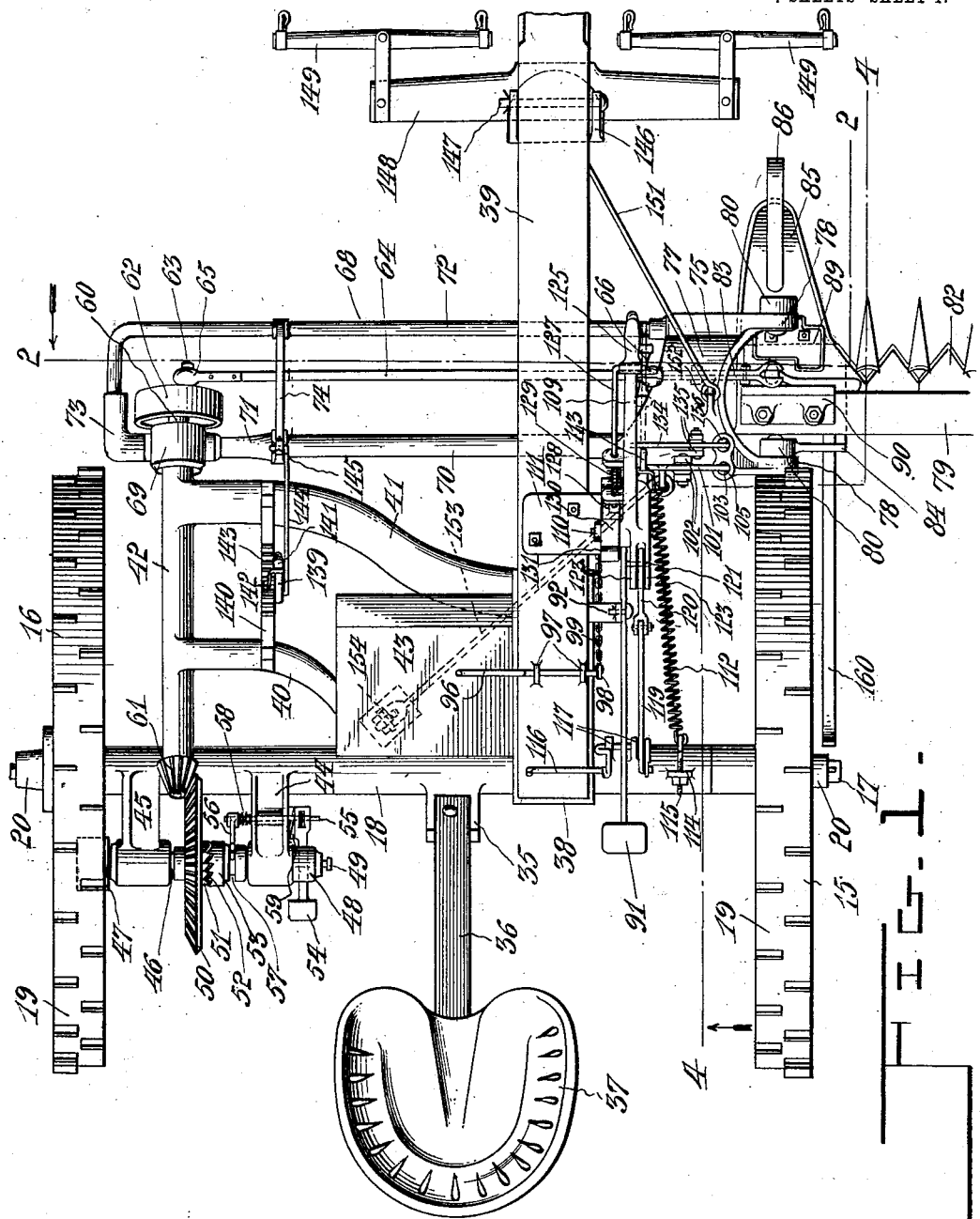

No. 747,384. PATENTED DEC. 22, 1903.
J. N. D'ARTOIS & C. BROUILLETTE.
MOWING MACHINE.
APPLICATION FILED APR. 27, 1903.
NO MODEL. 7 SHEETS—SHEET 1.

Witnesses: Joseph N. D'Artois, Inventors
Charles Brouillette,
By Marion & Marion
Attorneys No. 747,384. PATENTED DEC. 22, 1903.
J. N. D'ARTOIS & C. BROUILLETTE.
MOWING MACHINE.
APPLICATION FILED APR. 27, 1903.
NO MODEL. 7 SHEETS—SHEET 4.

Witnesses:
John P. Deufferwil
George W. Colles

Joseph N. D'Artois,
Charles Brouillette, Inventors

By Marion & Marion
Attorneys

No. 747,384. PATENTED DEC. 22, 1903.
J. N. D'ARTOIS & C. BROUILLETTE.
MOWING MACHINE.
APPLICATION FILED APR. 27, 1903.
NO MODEL. 7 SHEETS—SHEET 5.

Witnesses: Joseph N. D'Artois,
Charles Brouillette, Inventors

By Marion & Marion
Attorneys

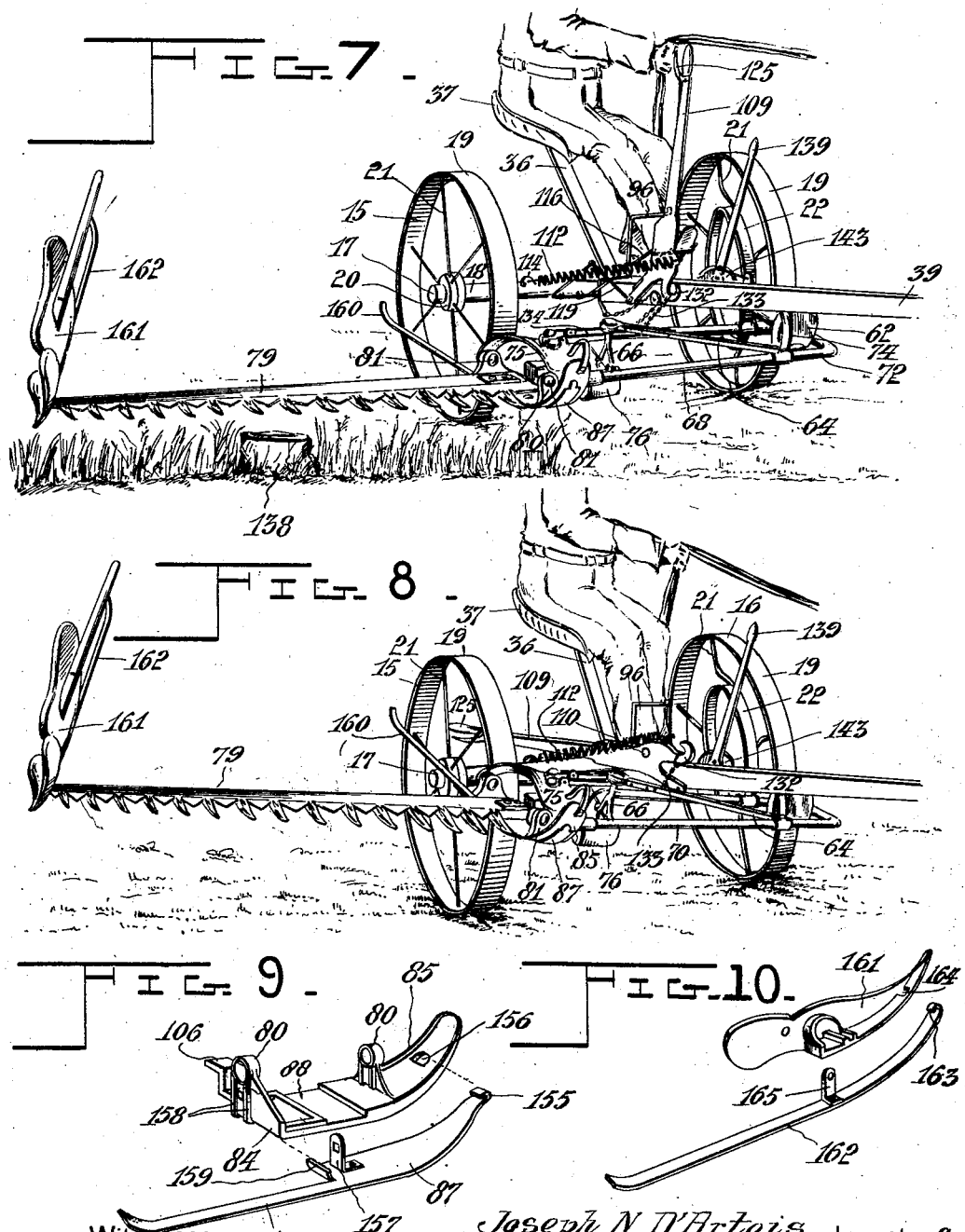

No. 747,384. PATENTED DEC. 22, 1903.
J. N. D'ARTOIS & C. BROUILLETTE.
MOWING MACHINE.
APPLICATION FILED APR. 27, 1903.
NO MODEL. 7 SHEETS—SHEET 7.
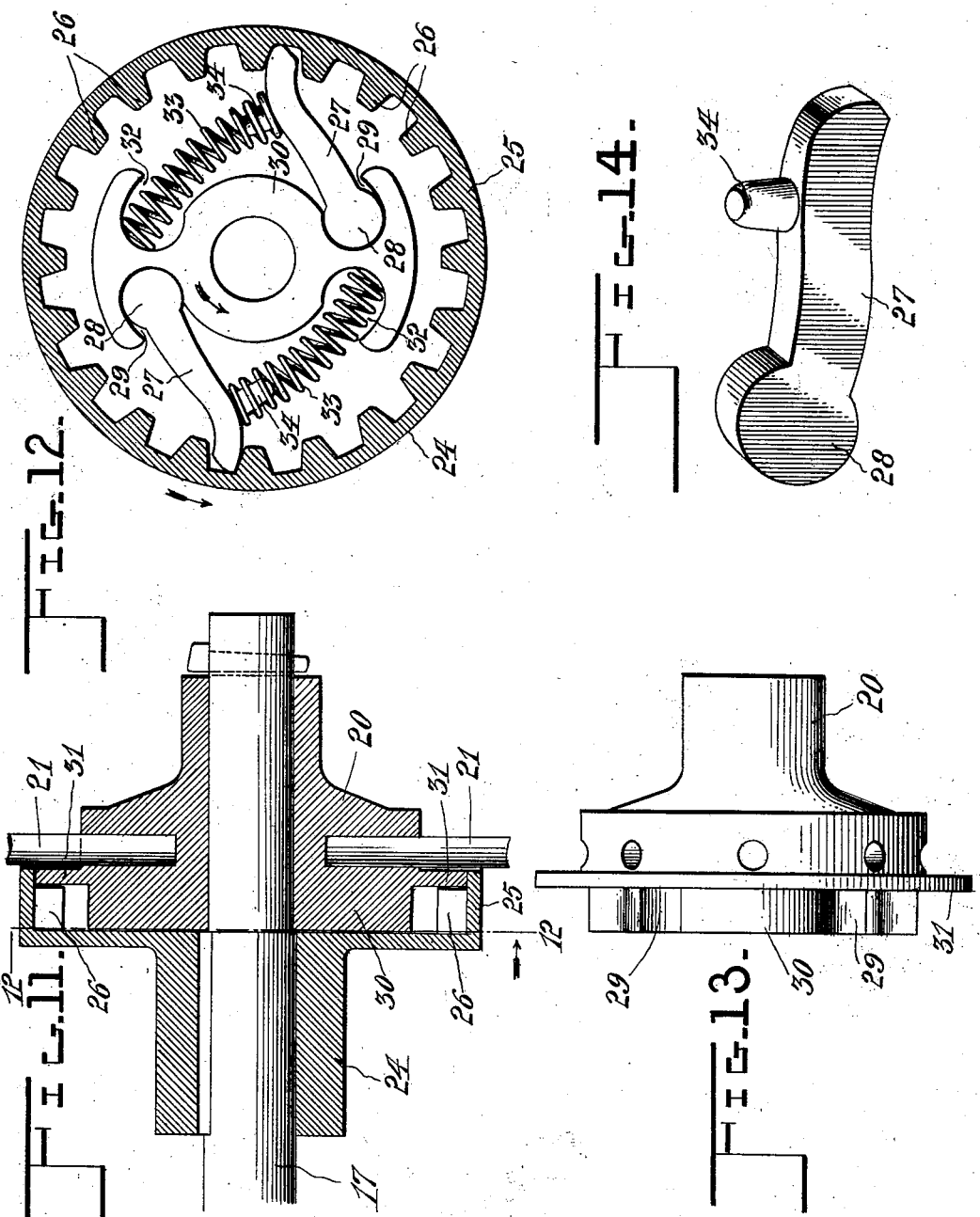
Witnesses:
Joseph N. D'Artois, Inventors
Charles Brouillette,
By Marion & Marion
Attorneys No. 747,384.

Patented December 22, 1903.

UNITED STATES PATENT OFFICE.

JOSEPH NAPOLÉON D'ARTOIS AND CHARLES BROUILLETTE, OF WATERLOO, CANADA.

MOWING-MACHINE.

SPECIFICATION forming part of Letters Patent No. 747,384, dated December 22, 1903.

Application filed April 27, 1903. Serial No. 154,512. (No model.)

*To all whom it may concern:*

Be it known that we, JOSEPH NAPOLÉON D'ARTOIS and CHARLES BROUILLETTE, subjects of the King of Great Britain, residing at Waterloo, in the county of Shefford, Province of Quebec, Canada, have invented certain new and useful Improvements in Mowing-Machines; and we do hereby declare that the following is a full, clear, and exact description of the invention, such as will enable others skilled in the art to which it appertains to make and use the same.

Our invention relates to an improvement in mowing-machines, particular reference being had to certain disadvantages found in the construction of existing machines which render them liable to breakage and prevent them from being sufficiently flexible in use for service in rough ground—that is to say, fields which contain many obstructions, such as stumps, stones, ditches, and the like.

One object of the invention which we have in view is to so construct and arrange the driving-gear by which the cutter-bar is operated from one of the main wheels of the machine that it is out of the way and not liable to be struck by obstructions rising from the ground and at the same time raise the entire gearing and the framework thereof high above the ground at a height substantially or nearly equal to that of the main driving-axle, whereby the machine is much less liable to fracture than heretofore.

Another object which we have in view is to arrange the mower-bar to go through a variety of manipulations, so that either end may be raised from the ground about the other end as a pivot which remains on the ground; or, on the other hand, the mower-bar may when desired be raised as a whole, thus enabling the bar to be raised as little as possible off the ground to clear obstructions, so that a single obstruction in the path of the mower-bar does not necessarily cause the interruption of the moving operation over the whole width of the swath until the obstruction is passed.

Another object which we have in view is to provide independent means for working the various manipulations of the machine from the seat of the driver with the least possible exertion and skill on his part.

Our invention consists in the construction and combination hereinafter described, and pointed out in the claims.

In the drawings accompanying this specification we have shown the most preferred form of our mowing-machine, and herein—

Figure 2:
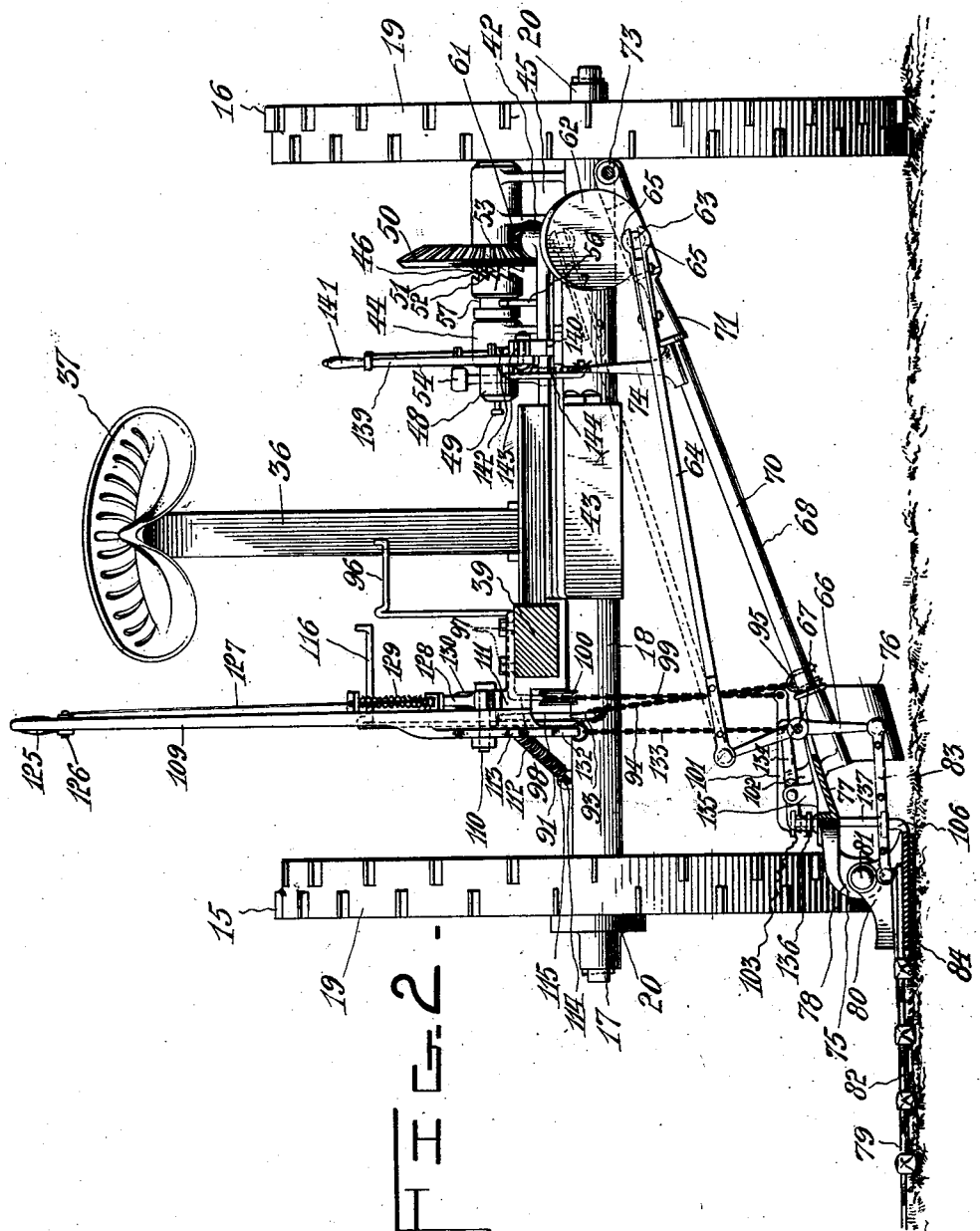
Figure 3:
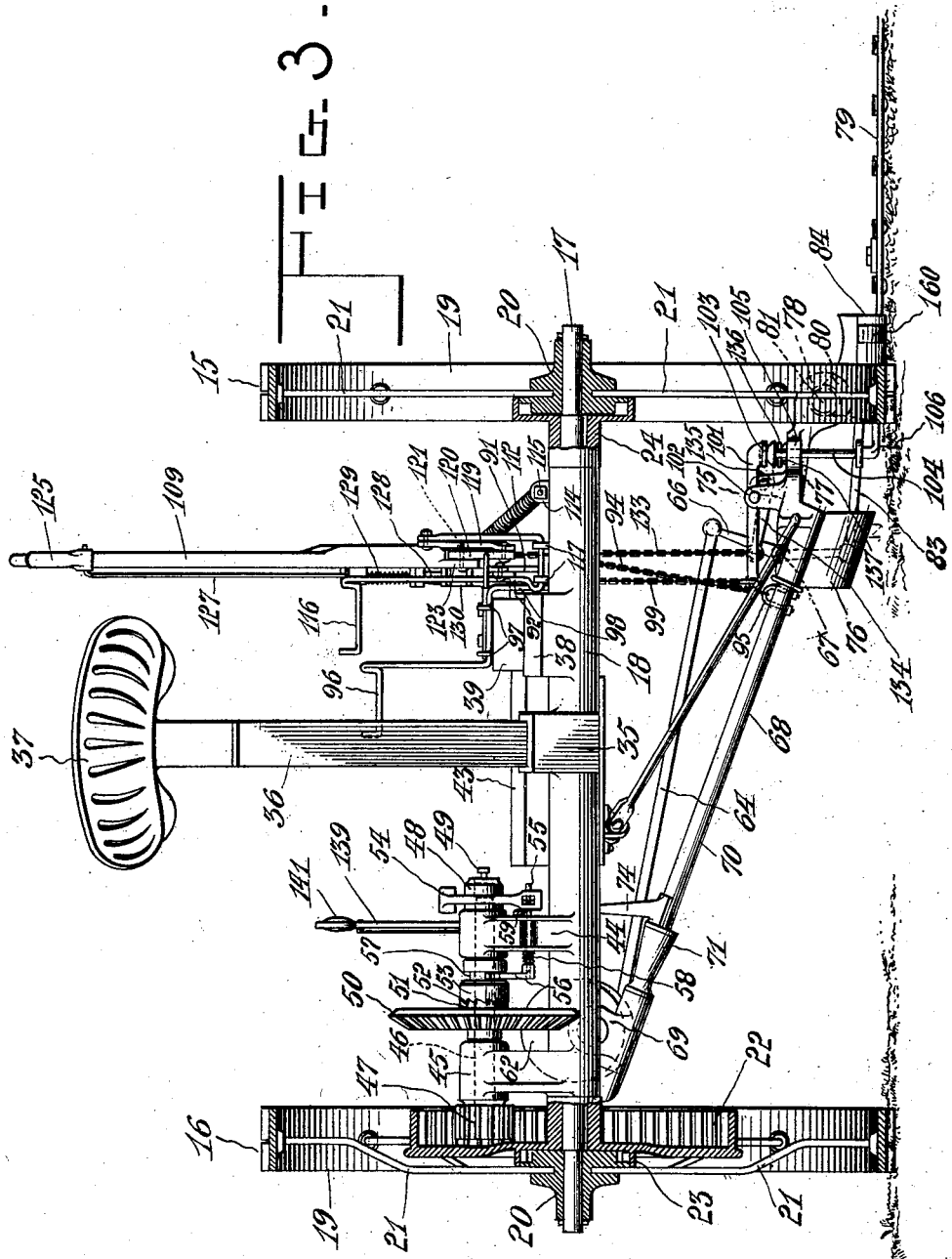
Figure 4:
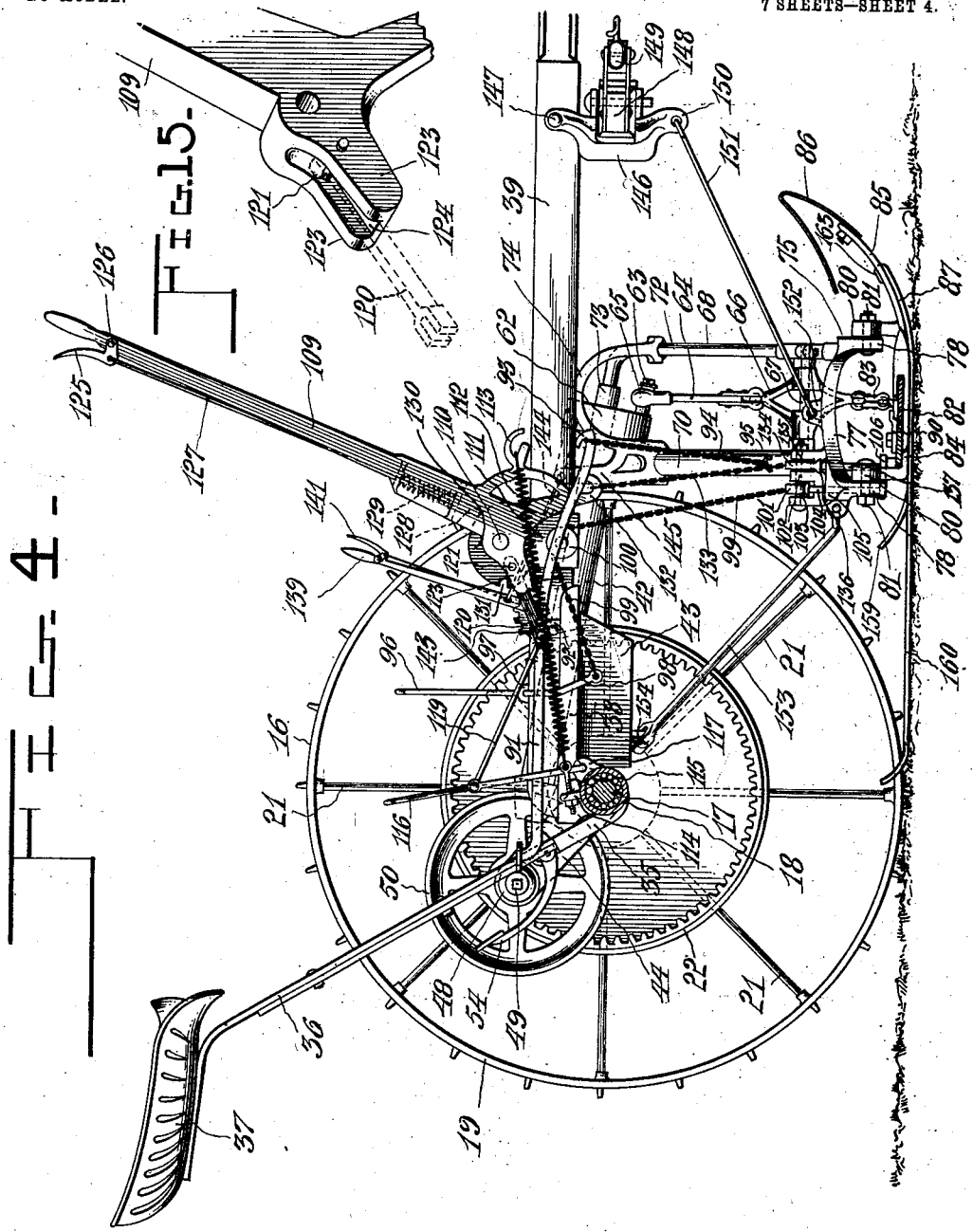
Figure 5:
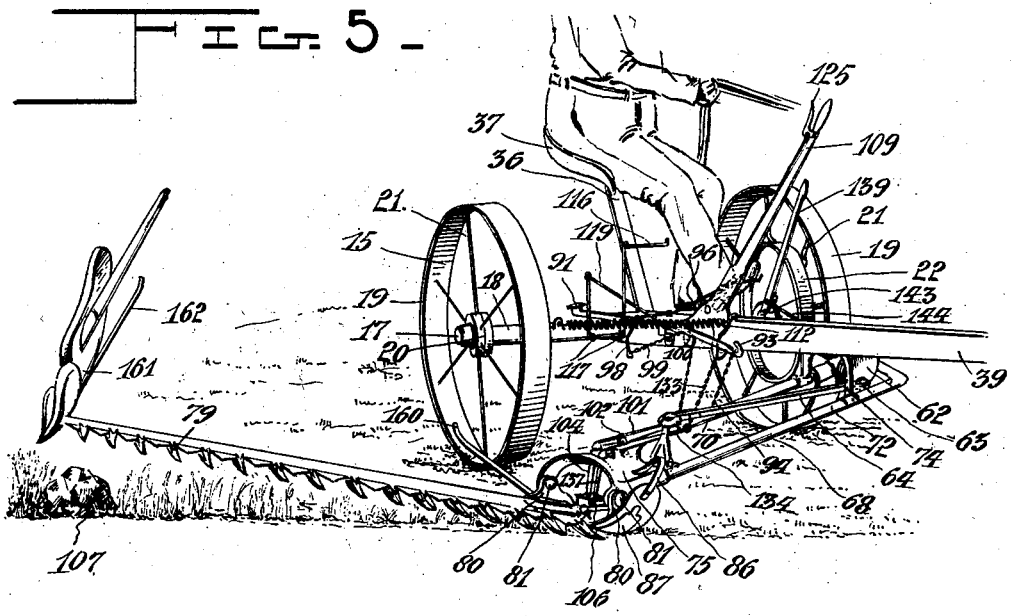
Figure 6:
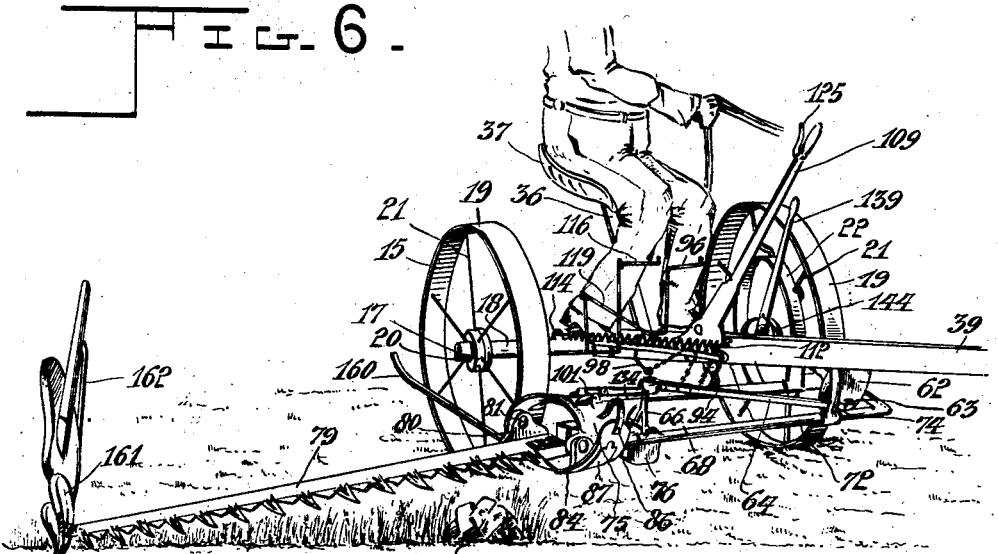

Figure 1 is a plan view of the body of the machine, the end of the mower-bar and the pole being broken away. Fig. 2 is a transverse section on the line 2 2 of Fig. 1 of the complete machine looking toward the rear. Fig. 3 is a rear elevation of the machine, showing the two driving-wheels and a portion of the main-shaft sleeve and gearing in section. Fig. 4 is a longitudinal section elevation of the machine on the line 4 4 of Fig. 1. Fig. 5 is a perspective view illustrating the first manipulation of the mower-bar. Fig. 6 is a similar view illustrating the second manipulation of the mower-bar. Fig. 7 is a similar view illustrating the third manipulation of the mower-bar. Fig. 8 is a similar view illustrating the fourth manipulation of the mower-bar. Fig. 9 is a perspective view of the inner shoe and runner. Fig. 10 is a perspective view of the outer shoe and runner. Fig. 11 is a longitudinal central sectional elevation through the hub and clutch of the right-hand driving-wheel. Fig. 12 is a side elevation of the clutch, taken on the line 12 12 of Fig. 11. Fig. 13 is a rear elevation of the hub. Fig. 14 is a perspective view of one of the pawls of the clutch. Fig. 15 is a perspective view of the lower end of the hand-lever for raising the mower-bar.

Our improved mowing-machine is mounted upon two main driving-wheels 15 and 16, which are themselves journaled loosely on opposite ends of the axle 17, which in turn carries the frame of the machine upon an axle-sleeve 18, extending from end to end of the axle between the two driving-wheels. Each driving-wheel comprises a rim 19, a hub 20, and a series of steel spokes 21, connecting the rim with the hub and which in the case of the left-hand driving-wheel—that is to say, the driving-wheel on the side opposite the mower-bar—are offset outwardly, so as to cause the hub 20 to lie outside the plane of the edge of the rim 19 and leaving space within the rim for an annular gear 22, which is keyed to the axle 17, as shown, between the hub 20 and the end of the axle-sleeve 18. This annular gear is formed with a clutch member 23 on its outer side, and engaging with the hub by a special form of clutch and on the opposite end of the axle 17 is also keyed a clutch member 24, similar in construction to the clutch member 23, but carrying no annular gear. The construction of the clutch comprising the two members 20 and 24 is illustrated in detail in Figs. 11, 12, 13, and 14, and it will be seen that the clutch member comprises an annular flange 25, having a series of lugs or teeth 26 surrounding its inner surface, with which engage two pawls 27 of the form shown in Fig. 14, having each an enlarged circular butt-end 28, which is seated in a similarly-shaped socket 29, formed in the projecting portion 30 of the adjacent face of the hub 20, which projecting portion enters and lies within the flange 25, the chamber or box being closed by a circular flange 31 on the hub. The projecting portion 30 has also a pair of sockets 32, in which are seated the ends of a pair of coiled springs 33, whose opposite ends are seated over a pair of studs or lugs 34, near the ends of the pawls 27, and which cause the pawls to be pressed outwardly, so as to engage the teeth 26, and it will be seen that when the wheel is forwardly rotating, as shown by the inner arrow in Fig. 12, the clutch member 24 will be caused to rotate likewise and to drive the axle 17; but when the wheel is rotated backwardly or is standing still while the other wheel rotates forwardly the clutch member will be rotated forwardly by the other driving-wheel independently of the driving-wheel engaging it, so that at no time is the axle 17 rotated backwardly. Of course the clutch member 23 on the annular gear 22 is similarly arranged, as will be readily understood, and the axle 17 is caused to drive the annular gear in the same direction.

The axle-sleeve 18, which is journaled on the axle, may be supported thereon by roller-bearings, as is customary, or otherwise, and it forms substantially a part of the frame of the machine, having formed thereon a lug 35, to which is secured the seat-post 36, carrying the seat 37, a lug 38, to which is secured the pole 39, a pair of bracket-lugs 40 and 41, supporting a sleeve 42 for the crank-shaft, a tool-box 43, and a second pair of bracket-lugs 44 and 45, projecting upwardly and rearwardly from the left-hand end of the sleeve and in which is journaled a counter-shaft 46, carrying on its left-hand end a pinion 47, which engages the annular gear 22 and having on its right-hand end a step-bearing 48, adjusted by a set-screw 49. Between the two lugs 44 and 45 is loosely mounted on the shaft a bevel-gear 50, having on its rear face clutch-teeth 51, which engage the teeth 52 on a clutch member 53, splined on the shaft and reciprocable longitudinally by means of a foot-lever 54, which is journaled on a rock-shaft 55, carrying at its opposite end a fork 56, engaging in the annular groove 57 in the clutch member 53, there being a compression-spring 58 tending to press the clutch member 53 into engagement with the clutch-teeth 51 and also acting as a torsion-spring to raise the lever 54. The lever 54 is also engaged by an oblique cam-surface 59 on the face of the bracket 44, so that when it is depressed it moves longitudinally toward the right, thus carrying the clutch member 53 out of engagement with the teeth 51. It will be seen from the connections hereinafter described, which are driven by the bevel-gear 50, that the depression of the foot-lever 54 by disengaging the bevel-gear 50 from the counter-shaft 46 stops the mower-bar from operation, whereas when the foot is removed from the foot-lever 54, as normally, the mower-bar is operatively connected with and driven by the annular gear 22.

Within the sleeve 42, which is, as shown, raised much higher than in ordinary mowing-machines and approximately on a level with the driving-axle, is the crank-shaft 60, having on its rear end a bevel-pinion 61, meshing with the bevel-gear 50, and on its other end a crank-disk 62, having a crank 63, to which is connected the pitman 64 by means of a pair of recessed bearing members 65. This pitman is connected at its other end with one arm of a bell-crank lever 66 of the form most specifically shown in Figs. 2 and 4, having a long bearing upon a pivot-pin 67, which is mounted on a swinging frame 68. This swinging frame is mounted to rotate on the sleeve 42 of the crank-shaft by a journal-bearing 69—that is to say, about the axis of the crank-shaft—so that in all positions the pitman 64 preserves the same relative position with the crank-shaft. The swinging frame 68 comprises a preferably tubular bar 70, fixed in one end in a socket-lug 71, pivotally mounted in the bearing-box 69 and a parallel rod 72 bent at its end and fixed in a rectangular socket-lug 73, pivoted on the opposite side of the bearing, so that the frame 68 forms a yoke in the center of which reciprocates the pitman 64, and it is further strengthened by an arched yoke 74, connecting the bars 70 and 72 at an intermediate point and having an upwardly-extending ear 145 for a purpose to be hereinafter mentioned. The two bars 70 and 72 of the frame 68 are joined together at their lower ends by a double yoke-piece 75, having sockets therein, in which the rods 70 and 72 are fixed, and arched webs extending over and under the mechanism connecting the cutter-bar operatively with the pitman 64, the lower arch 76 of the yoke-piece acting as a shield or guard to prevent the lower end of the lever 66 from being struck or broken by obstacles.

The upper arch 77 of the yoke-piece is formed with two laterally-projecting lugs 78, on which is pivotally mounted the finger-bar 79 or stationary portion of the mower-bar by means of ears 80 and pivot-pins 81. The cutter-bar 82, which reciprocates relatively to the finger-bar, is connected with the lower arm of the lever 66 by a link 83, the ends of the lever 66 being connected with the pitman 64 and link 83 by means of ball-joints, which avoid any possible torsion or wrenching at these points.

The inner end of the finger-bar on which the ears 80 are formed is in the form of a shoe 84, having a forwardly-extending and upwardly-curved toe 85 in the usual manner and provided, preferably, with a guard-plate 86, bolted thereto, and a backwardly-extending steel runner or shoe 87, which will be hereinafter more especially referred to. The shoe 84 is more especially illustrated in Fig. 9, and between the upstanding ears 80 thereof it has formed a socket or recessed portion 88 for the inner end of the cutter-bar, over which there are bolted plates 89 and 90, holding the cutter-bar in position.

On the lower end of the swinging frame there are mounted the mechanisms for manipulating the mower-bar, which will now be explained. These consist, first, of mechanism for raising the outer end of the mower-bar alone; secondly, for simply raising the end of the swinging frame, and, thirdly, for raising the swinging frame and the mower-bar together. The first of these mechanisms is operated by a foot-lever 96, pivoted on a lug 97 on the frame in suitable proximity to the driver's seat and intended to be pushed forward by the foot of the driver, its lower end 98 being connected with a chain 99, passing over a pulley 100 on the pole and thence downwardly to the inner end of a lever 101, fulcrumed on upstanding ears 102, formed on the yoke member 75. The other end of the lever 101 has a plain horizontally downwardly-facing surface 103, which abuts against the pin 104, mounted to reciprocate vertically in a socket 105 on the yoke-piece, (see Fig. 3,) and its lower end rests upon the horizontal upper surface of an upwardly-projecting lug 106, formed on the inner side of the shoe 85. When the pin 104 is depressed by the action of the lever 96, it acts to turn the mower-bar about its pivot 81, so as to raise the outer end thereof, as shown in Fig. 5, thus acting to override an obstruction 107 at or near the outer end of the mower-bar, while the inner portion of the mower-bar still continues to cut the grain, thus leaving the least possible amount of grain uncut. The second of these mechanisms is operated by a foot-lever 91, pivoted on a bracket 92, projecting from the side of the frame and whose forwardly-extending end 93 is hooked, as shown, and has attached thereto a chain 94, passing through a suitable staple-bolt 95, secured to the rod 70. It will be seen that when the lever 91 is depressed the frame 68 is raised by the chain connection 94, and in this case the mower-bar being left to itself its inner end only will be raised, as shown in Fig. 6, thus enabling it to override an obstruction 108 near its inner end while still continuing to cut the grain at its outer end.

The third manipulation of the mower-bar is operated by a hand-lever 109, pivoted upon a pin 110 in an upstanding bracket 111, secured to the pole 39 and provided with a spring 112, whose outer end is hooked over a forked lug 113 on the lever and whose inner end is secured to an ear 114 on the axle-sleeve by an adjustable eyebolt 115. The spring 112 is so placed that in the different positions of the hand-lever it will occupy positions on opposite sides of the pivot-pin 110, and thus tend to hold the lever 109 in either of its two extreme positions. The lever 109 being ordinarily out of convenient reach of the driver from his seat, as shown in Fig. 4, there is provided an auxiliary lever 116 to be operated by the driver's foot, which lever is pivoted in an ear 117 on the axle-sleeve and is connected at a point midway its length by a link 119 with a forked extension member 120, pivoted to the lever 109 upon a pin 121 between the ears 123. (Shown on enlarged scale in Fig. 15.) When the lever 116 is pushed forward, it presses down upon the extension member 120, which rests against the flat surface 124 between the ears 123, and thus causes the lever 109 to be lowered until it is brought into a position to be reached by the driver; but when the lever 109 is manipulated by hand it turns about the pivot 110, and the extension member 120 remains comparatively immovable, turning about the pin 121, which prevents the foot-lever 116 from being simultaneously operated. The lever 109 is provided with a finger-lever 125 at its upper end, pivoted at 126, connected by a rod 127 with a spring-latch 128, pressed downwardly by a compression-spring 129, and which rests against a smooth-faced segment 130, cast on the bearing-bracket 111 of the lever, this segment having a single notch 131 on a level with and at the rear of the pivot 110, with which the bolt 128 engages when the lever 109 is thrown downward into a horizontal position, as illustrated in Fig. 8.

Projecting slightly forwardly and below the pivot 110 a hooked projection 132 is formed on the lever, which forms a point of attachment for a chain 133, whose opposite end is connected with the inner end of the lever 134, fulcrumed in ears 135 on the yoke-piece 75 and which has at its shorter end a downwardly-facing horizontal surface 136, pressing against the head of a pin 137, reciprocably mounted in a socket in the yoke member and whose lower end also presses on the upper surface of the lug 106.

It will be seen that when the hand-lever 109 or foot-lever 116 is operated the hand-lever will be turned about its pivot, which will raise the chain 133, the action of which will be to raise as a whole the swinging frame 68 and the mower-bar, which latter is held rigid with the swinging frame in this instance by reason of the lever connection 134, which holds the mower-bar against rotating on its pivots 81. This manipulation is illustrated in Figs. 7 and 8. In Fig. 7 the operator is raising the mower-bar to override a stump 138 or other obstacle, in this instance using only the foot-lever, which is sufficient to raise the mower-bar just sufficiently to override the stump. When, however, a very high obstacle is met with or it is desired to raise the mower-bar completely over the grain, so as to discontinue cutting the same, without descending from the machine, the operator seizes the hand-lever and throws it over into a horizontal position, as illustrated in Fig. 8, which movement is assisted by the tension of the spring 112, and in which position it is held by the engagement of the bolt 128 with the notch 131.

Still another manipulation is possible with our machine, and this, while a feature of former machines, is performed on our machine by a novel construction. We refer to the tilting of the mower-bar to enable it to cut longer or shorter stubble. This is effected by a short hand-lever 139, mounted on a frame-piece 140 and having a finger-lever 141, actuating a latch-bolt 142, engaging with a quadrant 143. This hand-lever 139 is connected by a link 144 with the upstanding ear 145 on the yoke-piece 74. It will be remembered that the socket-pieces 71 and 73 were described as pivotally mounted in the bearing-box 69, and it will now be seen that by oscillating the hand-lever 139 the swinging frame 68 is longitudinally oscillated about its axis in the bearing-box, which will in turn cause the mower-bar to be tilted longitudinally, and it is held in any desired position by means of the notched quadrant 143.

As supplementary construction details we provide draft mechanism comprising a yoke-casting 146, connected by a pin 147 to the pole 39 and having connected thereto a doubletree 148 and swingletrees 149, the lower end of the yoke 146 having an ear 150, connected by a link-rod 151 to an ear 152 on the yoke-piece 75, while this is again braced to the driving-axle by means of a diagonal rod 153, secured to a lug 154, projecting from the rear portion of the frame.

In order now to enable the mower-bar to run smoothly over uneven fields, especially those having ditches, cavities, and the like therein, we provide the shoe 85 with a long steel runner 87. (Illustrated more particularly in Figs. 4 and 9.) This runner has a hooked end 155, engaging with an aperture 156 in the shoe 85, and its rear end has an upstanding ear 157, bolted to the ear 80 and fixed in position by means of the guide-ribs 158. The main portion of the runner may be cut off and turned up, as at 159; but there is provided the rearward extension 160, which extends horizontally a sufficient distance to bridge any such cavities or holes as may occur in the field. Similarly on the outer end of the mower-bar—that is to say, on the outer shoe 161, Fig. 10—there is provided a long rearwardly-extending steel runner 162, which has a hooked end 163, engaging with an aperture 164 in the shoe, and an ear 165, bolted to the side of the shoe. This runner acts similarly in sustaining the outer end of the mower-bar. These runners are not essential to the operation of the remaining mechanism, but will be used in general only where the nature of the work requires it and may be readily taken off or put on whenever desired.

From the above description it will be evident that our machine is capable of a variety of manipulations such as will enable it to cut grain most economically and in all cases to cut all the grain possible in the field. It will of course be understood that the mower-bar is also capable of being raised into vertical position in the ordinary manner of mower-bars, in this case turning freely about its pivot-pins 80.

While we have shown in the accompanying drawings the preferred form of our invention, it will be understood that we do not limit ourselves to the precise form shown, for many of the details may be changed in form or position without affecting the operativeness or utility of our invention, and we therefore reserve the right to make all such modifications as are included within the scope of the following claims or of mechanical equivalents to the structures set forth.

Having thus described our invention, what we claim as new, and desire to secure by Letters Patent, is—

1. A mowing-machine comprising a pair of driving-wheels, a frame mounted thereon, a longitudinal crank-shaft raised above the axis of said driving-wheels, mechanism connecting said driving-wheels with the rear end of said crank-shaft, a swinging frame pivoted on the axis of said crank-shaft, a mower-bar pivoted to the free end of said swinging frame, a reciprocating cutter-bar, a pitman connecting said cutter-bar with the front end of said crank-shaft, means for raising the free end of said swinging frame permitting the mower-bar to turn loosely on its pivot, and independent means for raising said mower-bar and said swinging frame rigidly together.

2. A mowing-machine comprising a pair of driving-wheels, a frame mounted thereon, a longitudinal crank-shaft raised above the axis of said driving-wheels, mechanism connecting said driving-wheels with said crank-shaft at its rear end, a swinging frame pivoted on the axis of said crank-shaft, a mower-bar pivoted to the free end of said swinging frame, a reciprocating cutter-bar, a pitman connecting said cutter-bar with the front end of said crank-shaft, means for raising the free end of said swinging frame permitting the mower-bar to turn loosely on its pivot, means for retaining said mower-bar rigid with said swinging frame while the latter is raised, and means for independently oscillating said mower-bar about its pivot to raise the outer end of the same.

3. A mowing-machine comprising a pair of driving-wheels, a frame mounted thereon, a longitudinal crank-shaft raised substantially to a level with the axis of said driving-wheels, mechanism connecting said driving-wheels with said crank-shaft, a mower-bar pivoted to the free end of said swinging frame, a reciprocating cutter-bar, an upright oscillating lever pivoted on said swinging frame and connected at one end to said cutter-bar, a pitman connecting said crank-shaft to the upper end of said oscillating lever, means for raising the free end of said swinging frame while permitting said mower-bar to turn loosely about its pivot, independent means for raising said swinging frame while holding said mower-bar rigid therewith, and independent means for oscillating said mower-bar about its pivot to raise the outer end of the same.

4. In a mowing-machine, the combination of a swinging frame pivoted at one end to the main frame, a mower-bar pivoted to the free end of said swinging frame and having an upstanding heel or projection inwardly of the pivot thereof, a vertical pin reciprocably mounted in said swinging frame and abutting against said heel or projection and having a head normally resting on said swinging frame when said mower-bar is level, a lever fulcrumed on said swinging frame and having one end abutting against the head of said pin, and a manually-operated lever fulcrumed on the main frame and connected with said first-named lever, whereby the oscillation of said manually-operated lever will raise the swinging frame and mower-bar bodily.

5. In a mowing-machine, the combination of a swinging frame pivoted at one end to the main frame, a mower-bar pivoted to the free end of said swinging frame and having an upstanding heel or projection inwardly of the pivot thereof, a vertical pin reciprocably mounted in said swinging frame and abutting against said heel or projection and having a head normally resting on said swinging frame when said mower-bar is level, a lever fulcrumed on said swinging frame and having one end abutting against the head of said pin, a manually-operated lever fulcrumed on the main frame and connected with said first-named lever, whereby the oscillation of said manually-operated lever will raise the swinging frame and mower-bar bodily, a second vertical pin reciprocably mounted in said swinging frame and likewise pressing against said heel or projection, and having a head normally projecting above the surface of the swinging frame, a third lever fulcrumed on said swinging frame and having one end abutting against said head to depress the same, and a second manually-operated lever journaled on the main frame and connected with said last-mentioned lever, whereby the operation of said second manually-operated lever will depress said second pin and turn the mower-bar about its pivot to raise its outer end.

6. In a mowing-machine, the combination of a swinging frame pivoted at one end to the main frame, a mower-bar pivoted to the free end of said swinging frame and having an upstanding heel or projection inwardly of the pivot thereof, a vertical pin reciprocably mounted in said swinging frame and abutting against said heel or projection and having a head normally resting on said swinging frame when said mower-bar is level, a lever fulcrumed on said swinging frame and having one end abutting against the head of said pin, a manually-operated lever fulcrumed on the main frame and connected with said first-named lever, whereby the oscillation of said manually-operated lever will raise the swinging frame and mower-bar bodily, a second vertical pin reciprocably mounted in said swinging frame and likewise pressing against said heel or projection, and having a head normally projecting above the surface of the swinging frame, a third lever fulcrumed on said swinging frame and having one end abutting against said head to depress the same, a second manually-operated lever journaled on the main frame and connected with said last-mentioned lever, whereby the operation of said second manually-operated lever will depress said second pin and turn the mower-bar about its pivot to raise its outer end, and a third manually-operated lever fulcrumed on the main frame and connected with a point on said swinging frame, whereby the operation of said last-named lever will cause the inner end of said mower-bar to be raised about its outer end as a pivot.

7. In a mowing-machine, the combination of a main frame, a swinging frame journaled thereto, a mower-bar pivoted to the free end of said swinging frame, a hand-lever fulcrumed on said main frame, a foot-lever likewise fulcrumed on said main frame, an extension 120 pivotally connected with said hand-lever and arranged to turn in one direction only, a compression-link 119 connecting said foot-lever with said extension, whereby to turn said hand-lever when said foot-lever is pushed forward while permitting said hand-lever to be turned without affecting the position of said foot-lever, a third lever fulcrumed on said swinging frame, a connection between said third lever and a short arm of said hand-lever, a pin mounted to reciprocate vertically in a socket in said swinging frame and against which the other end of said last-named lever abuts to depress the same, and a heel formed on said mower-bar and projecting inwardly of the pivot thereof and abutting against the lower end of said pin.

In witness whereof we have hereunto set our hands in the presence of two witnesses.

JOSEPH NAPOLÉON D'ARTOIS.
CHARLES $\overset{\text{his}}{\times}$ BROUILLETTE.
$\phantom{\text{CHARLES }}{}^{\text{mark}}$ Witnesses:
JOS. C. LEFEBVRE,
C. E. HAENEY.